United States Patent [19]

Smith

[11] 4,380,171

[45] Apr. 19, 1983

[54] METHOD AND APPARATUS FOR MEASURING NORMAL CONTACT FORCES IN ELECTRICAL CONNECTOR

[75] Inventor: Terry J. Smith, Ephrata, Pa.

[73] Assignee: AMP Incorporated, Harrisburg, Pa.

[21] Appl. No.: 220,926

[22] Filed: Dec. 29, 1980

[51] Int. Cl.³ ............................ G01L 1/22; G01L 5/00
[52] U.S. Cl. .................................... 73/161; 73/862.54; 73/862.65
[58] Field of Search ................ 73/161, 774, 775, 777, 73/862.54, 862.65; 358/5, 47

[56] References Cited

U.S. PATENT DOCUMENTS 2,626,523  1/1953  Pike ........................................ 73/161
3,388,590  6/1968  Dryden ............................ 73/774 X
4,246,783  1/1981  Steven et al. ........................ 73/161

FOREIGN PATENT DOCUMENTS 47-5915  2/1972  Japan ................................ 73/862.54

Primary Examiner—Charles A. Ruehl
Attorney, Agent, or Firm—Russell J. Egan

[57] ABSTRACT

An apparatus for measuring the contact force of a terminal mounted in a multi-terminal circuit board connector, the measured force being applied normal to the surface of a circuit board received in the connector, has a transducer employing four strain gauges connected in a bridge arrangement with pairs of the gauges being positioned at opposite ends of a fully supported beam. The strain at the end points of the beam are averaged by the strain gauges so that no matter where the forces are applied normal to the beam by the terminal being measured, the deflection is always negligible and the area of the beam upon which the contact force is applied is not critical.

4 Claims, 3 Drawing Figures

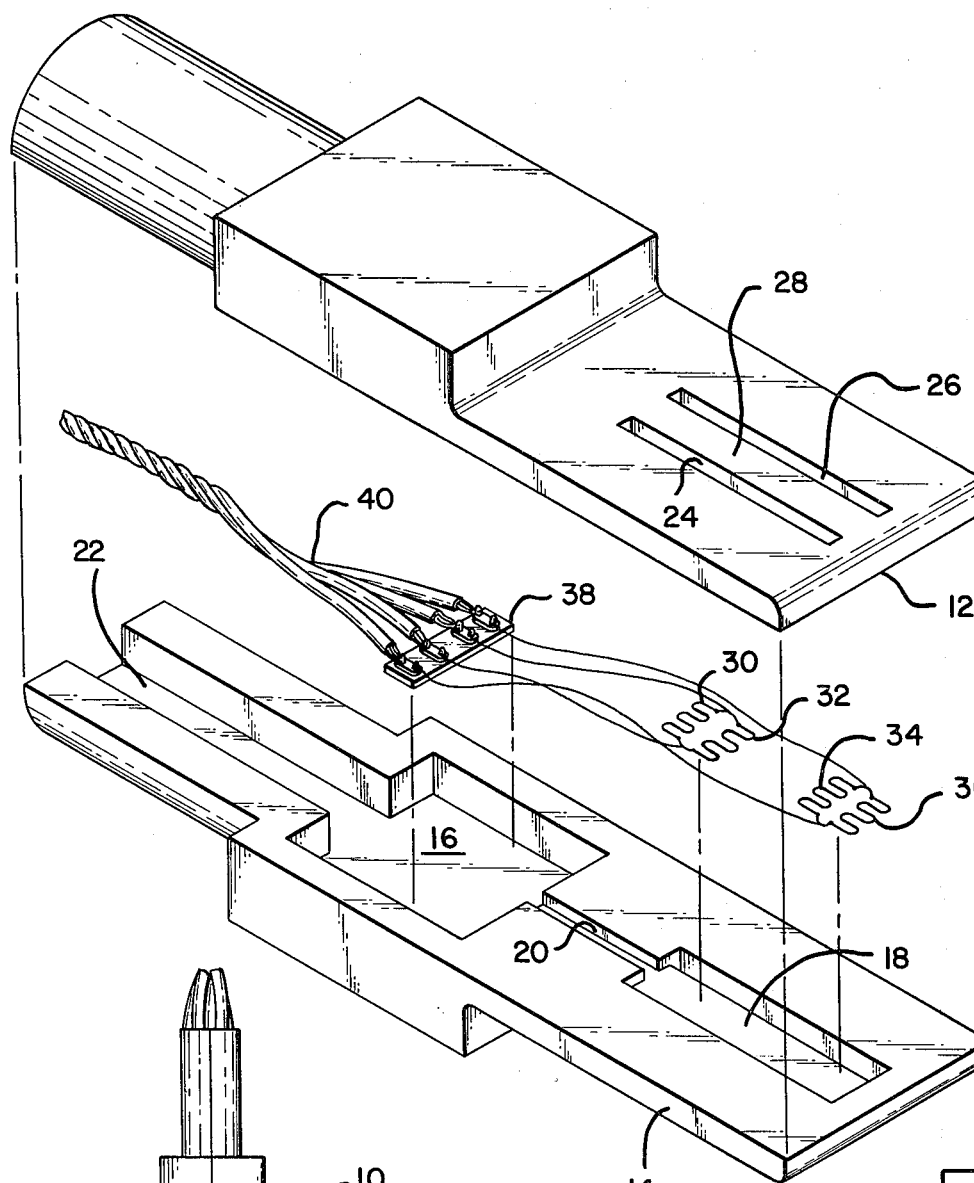
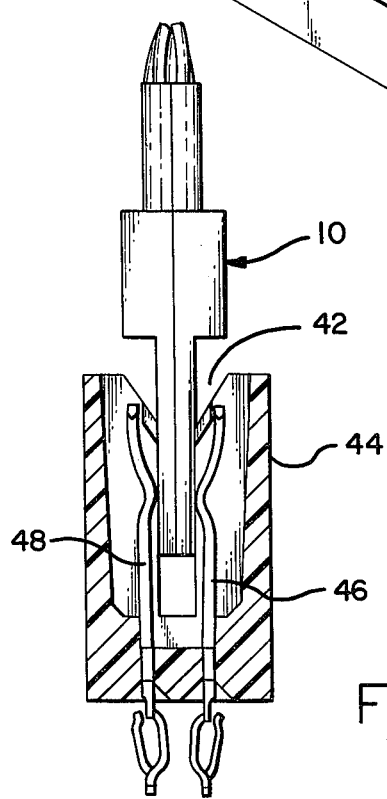
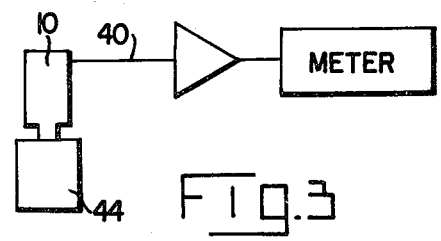
Fig.1
Fig.2
Fig.3

METHOD AND APPARATUS FOR MEASURING NORMAL CONTACT FORCES IN ELECTRICAL CONNECTOR

BACKGROUND OF THE INVENTION

1. The Field Of The Invention

The present invention concerns a method and apparatus for measuring the normal contact force of terminals in multiple terminal electrical connectors, and in particular, to a method and apparatus which can be utilized in a non-destructive manner.

2. The Prior Art

The force required to insert a printed circuit board into an edge board connector is easily measured and specifications for such insertion force can readily be determined. The force with which the connector terminals engage the printed circuit board, the normal force, is more difficult to measure. The normal forces of the terminal spring arm directly affect cycling durability and the magnitude and consistency of the normal force is a significant variable in the reliability of a connector system.

The difficulties encountered in known systems for measuring such normal contact forces are described in the article, "Non-Destructive Measurement Of Printed Wiring Board Connector Normal Contact Forces" by Roy Currants, *Proceeding of the Home Conference on Electrical Contacts*, 1977, and the article, "Electrical Contact Normal Load Measurement Device" by Dr. Weichien Chow, *Proceedings of the Electronic Components Conference*, 1968, the disclosures of which are incorporated herein by reference.

SUMMARY OF THE INVENTION

The present invention concerns a method and apparatus for measuring contact normal forces of terminals mounted in known electrical connectors, particularly those for receiving edge portions of printed circuit boards. The measurement is accomplished by utilization of a normal force transducer having pairs of strain gauges mounted at opposite ends of a fully supported beam. The strain gauges are connected together in a balanced bridge configuration. The middle section of the beam is made independent of its moment arm. By making the beam independent of the moment arm, the force applied by the terminal can be applied anywhere in the middle section of the beam and still be accurately read. The deflection of the beam is no longer important.

It is therefore an object of the present invention to produce an improved method for measuring the normal force of terminals in an edge board connector or the like by applying the contact force to an intermediate portion of a fully supported beam, having pairs of strain gauges mounted at the opposite ends thereof with the strain gauges connected in a balanced bridge configuration.

It is another object of the present invention to teach a method for measuring normal forces of electrical terminals in which, no matter where the force is applied to the measurement device, the deflection caused thereby will always be negligible so that the area where the force is applied will not be critical.

It is still another object of the present invention to teach a method of measuring normal contact force of electrical terminals which method utilizes a unique beam design and strain gauge technology to accurately measure the force applied by the terminal.

It is a further object of the present invention to produce a device for measuring normal contact force of electrical terminals which device utilizes a fully supported beam with a balanced bridge formed by pairs of strain gauges fixed at opposite ends of the beam making it independent of any movement arm so that the contact force can be applied anywhere intermediate the ends of the beam and still be accurately read.

It is another object of the present invention to produce an improved normal contact force measuring device which achieves accurate output readings with negligible beam deflection.

It is a still further object of the present invention to produce an improved normal contact force measuring device which can be readily and economically manufactured.

The means for accomplishing the foregoing objects and other advantages of the present invention will become apparent to those skilled in the art from the following detailed description taken with reference to the accompanying drawings.

BRIEF DESCRIPTION OF THE DRAWINGS

FIG. 1 is an exploded perspective view of a normal contact force measuring device according to the present invention;

FIG. 2 is a side elevation, partly in section, of the subject device as it would be applied to an edge board connector of conventional design; and FIG. 3 is a block diagram of the present invention.

DETAILED DESCRIPTION OF THE PREFERRED EMBODIMENT

The subject normal force strain gauge transducer 10 is shown in FIGS. 1 and 2 and comprises a pair of mating metal housing members 12, 14 which define therebetween a first chamber 16, a second chamber 18, a first channel 20 interconnecting the first and second chamber, and an axial channel 22 connecting the first chamber 16 with the exterior of the device. The housing member 12 includes a pair of parallel spaced slots 24, 26 defining a fully supported beam 28 therebetween. The beam is dimensioned to be slightly narrower and shorter than the chamber 18. The chamber 18 also contains two pairs of strain gauges 30, 32, 34, 36, which are connected in a bridge configuration and are arranged in pairs at opposite ends of the fully supported beam 28. The gauges 30, 32, 34, 36, are connected to a terminal block 38 and cable 40 to amplifier and display means (see FIG. 3) which are well known, for example, see U.S Pat. No. 4,200,986, the disclosure of which is incorporated herein by reference. The wires from the gauges are preferably adhered to the beam 28 so that they will always be at the same temperature as the beam thereby providing temperature compensation.

The operation of the subject measuring device is shown in FIG. 2 with the device 10 being inserted into the opening 42 of an edge board connector 44 between the rows of spaced terminals 46, 48. The connector 44 is of a known type such as that shown in U.S. Pat. No. 4,077,694, the disclosure of which is incorporated herein by reference. Terminal 46, for the purposes of this consideration, lies against and intermediate the ends of the fully supported beam 28 while terminal 48 lies against the backside of the housing 14. This arrangement will give a reading of the normal force applied by the terminal 46 against the beam 28.

The subject device operates according to the following. Unlike other normal force measuring devices, the subject device is comprised of a beam which is fixed at both ends. Conventional devices have used another technique which relies on a beam at least one end of which is floating. Utilization of a fixed beam requires that four gauges be employed as opposed to two gauges in the standard measurement device.

The strain gauges are designated 30, 32, 34, 36 respectively, and the normal force to be measured is applied to the beam 28 anywhere between the gauges 32, 34. Assuming that the beam is cut in half to form two cantilever beams, each half would have a pair of strain gauges fixed adjacent the supported end. Applying a force at the free end of the beam would give a higher strain in gauge 30 than in 32 and this difference could be charted as a straight line because the beam is operating in the elastic limits of its modulus. Thus, the beam is made independent of its moment arm (the length of the beam). In other words, it does not matter where the force is applied beyond the gauges 30 and 32 will always be the same. Likewise with the other end of the beam the same thing will happen regarding the readings from the gauges 34, 36. Thus, as long as the force falls between the gauges 32 and 34, the total output from the balanced bridge will be the output of 30 minus the out put of 32 and the output of 36 minus the output of 34 which results will always be equal. These two outputs can be added to result in the total normal force applied by the terminal. The voltage output will be the total of the voltage of gauge 30 minus the voltage of gauge 32 plus the voltage of gauge 36 minus the voltage of gauge 32.

The present invention is suitable for use with single sided connectors, such as shown in U.S. Pat. No. 3,845,535; double sided connectors such as shown in U.S. Pat. No. 4,077,694; double blade terminals, such as shown in U.S. Pat. No. 3,787,801; or zero insertion force connectors, such as shown in U.S. Pat. No. 3,899,234 all of these disclosures being incorporated herein by reference.

The present invention may be subject to many modifications and changes without departing from the spirit or essential characteristics thereof. The present embodiment is therefore to be considered in all respects as illustrative and not restrictive of the scope of the invention.

What is claimed is:

1. A device for measuring the force of an electrical terminal mounted in an edge board connector and applied normal to the surface of a circuit board received in the connector, said device comprising:

a housing having two mating rigid metallic members defining a cavity therebetween, said members together having an outer profile enabling insertion of the device into said connector, one of said members having at least one pair of elongated slots defining therebetween at least one beam supported at both ends and disposed over said cavity, each said at least one beam being profiled to accommodate a terminal, and a pair of strain gauges applied to each end of each said beam, means interconnecting said strain gauges of each beam in a respective balanced bridge configuration whereby when the device is inserted into the connector a respective terminal contacts and applies force normal to the surface of and intermediate the ends of a beam causing a difference in voltage output from said strain gauges in said pairs of strain gauges which difference is summed to give an indication of the force applied by said terminal in a direction normal to said beam.

2. A device for measuring according to claim 1 further comprising:

a second cavity spaced from said cavity and connected thereto by a groove in one of said members, a terminal board in said second cavity having said means interconnecting said strain gauges connected thereto, and a second groove in one of said members providing access for a cable to said terminal board.

3. A device for measuring according to claim 1 wherein:

said means interconnecting said strain gauges are adhered to said beam to be at substantially the same temperature thereby providing temperature compensation.

4. A device for measuring according to claim 1 further comprising:

means to amplify the output of said balanced bridge, and means to display said amplified output.

* * * * *